United States Patent
Bacic et al.

(10) Patent No.: US 10,926,882 B2
(45) Date of Patent: Feb. 23, 2021

(54) CONTROL SYSTEM FOR A CABIN BLOWER SYSTEM

(71) Applicant: ROLLS-ROYCE plc, London (GB)

(72) Inventors: Marko Bacic, Oxford (GB); Benjamin J. Sellers, Bath (GB); Rory D. Stieger, Derby (GB)

(73) Assignee: ROLLS-ROYCE PLC, London (GB)

( * ) Notice: Subject to any disclaimer, the term of this patent is extended or adjusted under 35 U.S.C. 154(b) by 342 days.

(21) Appl. No.: 15/704,831

(22) Filed: Sep. 14, 2017

(65) Prior Publication Data

US 2018/0079510 A1    Mar. 22, 2018

(30) Foreign Application Priority Data

Sep. 20, 2016 (GB) ...................... 1615969

(51) Int. Cl.
*B64D 13/04* (2006.01)
*F04D 27/02* (2006.01)
(Continued)

(52) U.S. Cl.
CPC ............ *B64D 13/04* (2013.01); *B64D 27/16* (2013.01); *F02C 7/32* (2013.01); *F04D 25/02* (2013.01);
(Continued)

(58) Field of Classification Search
CPC .. F02C 6/08; F02C 7/141; F02C 7/143; F02C 7/185; F05D 2260/213; B64D 13/06; B64D 2013/0611
See application file for complete search history.

(56) References Cited

U.S. PATENT DOCUMENTS 7,805,947 B2 * 10/2010 Moulebhar ........... F01D 21/003
                                                           60/39.163
9,382,910 B2 * 7/2016 Jan .......................... F04D 17/10
(Continued)

FOREIGN PATENT DOCUMENTS

EP    2955334 A1    12/2015
GB    604594 A      7/1948
GB    711120 A      6/1954

OTHER PUBLICATIONS

Nov. 3, 2016 Search Report issued in Briitsh Application No. 1615969.1.

*Primary Examiner* — Gerald L Sung
*Assistant Examiner* — William L Breazeal
(74) *Attorney, Agent, or Firm* — Oliff PLC

(57) ABSTRACT

A control system for use in controlling a cabin blower system. The cabin blower system includes a gas turbine engine spool, a cabin blower compressor powered by the spool and arranged in use to compress fluid used in a cabin of an aircraft, and one or more control mechanisms via which the control system controls the power extracted by the cabin blower compressor from the spool. The control system is arranged in use to control the power extracted from the spool by the cabin blower compressor in accordance with one or more primary control parameters. The control system is arranged in use to alter the spool power extracted by the cabin blower compressor by comparison with the power that would have been extracted in accordance with the primary control parameters alone, in response to modifications in a secondary control parameter indicative of the commencement or occurrence of an engine transient.

13 Claims, 4 Drawing Sheets

(51) Int. Cl.
  *B64D 27/16* (2006.01)
  *F02C 7/32* (2006.01)
  *F04D 25/02* (2006.01)
  *F04D 27/00* (2006.01)
  *B64D 13/06* (2006.01)

(52) U.S. Cl.
  CPC ....... *F04D 27/002* (2013.01); *F04D 27/0261* (2013.01); *B64D 2013/0603* (2013.01); *F05D 2220/323* (2013.01); *F05D 2260/40* (2013.01); *F05D 2270/101* (2013.01); *F05D 2270/30* (2013.01); *Y02T 50/60* (2013.01)

(56) References Cited

U.S. PATENT DOCUMENTS

| | | | |
|---|---|---|---|
| 2002/0170295 A1 | 11/2002 | Chapman | |
| 2015/0275769 A1* | 10/2015 | Foutch | F02C 9/18 60/776 |
| 2016/0167790 A1* | 6/2016 | Hipsky | F02C 7/32 74/15.4 |
| 2017/0191413 A1* | 7/2017 | Knight | B64D 13/02 |

* cited by examiner

CONTROL SYSTEM FOR A CABIN BLOWER SYSTEM

The present disclosure concerns gas turbine engine compressor stability during transient operation. More specifically the disclosure concerns a control system for a cabin blower system, a cabin blower system and a method of increasing the surge margin of a gas turbine engine compressor during an engine transient.

With increasing rotation speed a compressor can operate with increasing pressure ratio across it. Where however the rotation speed falls too low with respect to the pressure ratio across the compressor it may stall and/or surge (temporary reversal of flow direction). The margin between pressure ratio across a turbine for a given rotation speed and the pressure ratio at which a surge would occur at that rotation speed is called the surge margin.

Many factors can reduce surge margin during engine operation. Engine transients (a change in operating condition e.g. compressor pressure ratio and/or core-flow) are often associated with a reduction in surge margin of at least one compressor of a gas turbine engine. By way of example, a high pressure compressor may respond more quickly to a slam acceleration (i.e. rapid increase in fuel flow) than an intermediate pressure compressor in view of the high pressure compressor having reduced weight at smaller radii and therefore inertia by comparison with the intermediate pressure compressor. This may increase the pressure ratio across the intermediate pressure compressor with only a delayed increase in intermediate compressor rotation rate, giving rise to a reduction in the surge margin of the intermediate pressure compressor. Another factor affecting surge margin is the power extracted from a spool by ancillary systems, e.g. an accessory gearbox. The more heavily loaded a spool is, the slower its associated compressor will rotate, thus potentially reducing its rate of rotation by comparison with the pressure ratio across it.

Maintaining sufficient surge margin under various operation conditions is a known and significant constraint in terms of compressor and whole engine design in the field of gas turbine engines.

According to a first aspect there is provided a control system arranged for use in controlling a cabin blower system, the cabin blower system comprising a gas turbine engine spool, a cabin blower compressor powered by the spool and arranged in use to compress fluid used in a cabin of an aircraft, and one or more control mechanisms via which the control system controls the power extracted by the cabin blower compressor from the spool, the control system being arranged in use to control the power extracted from the spool by the cabin blower compressor in accordance with one or more primary control parameters and where further the control system is arranged in use to alter the spool power extracted by the cabin blower compressor by comparison with the power that would have been extracted in accordance with the primary control parameters alone, in response to modifications in a secondary control parameter indicative of the commencement or occurrence of an engine transient.

A cabin blower system is used to pressurise the cabin of an aircraft. Cabin blower compressors are typically driven by one or more associated gas turbine engines of the aircraft. The gas turbine engine may be used to drive a cabin blower compressor in a number of ways (e.g. using electrical power generated by the engine or mechanically). Demanded cabin flow may come in the form of a signal from an associated aircraft (e.g. from its environmental control system).

The load represented by the cabin blower compressor may consume a significant proportion of the spool power, especially during lower power operation of the engine. Furthermore, because engine dynamics will materially respond much more quickly than cabin pressurisation to an alteration in the power extracted by the cabin blower compressor, a temporary change in cabin blower compressor speed can be countenanced. By way of example, a compressor working line excursion during an engine transient (e.g. an acceleration or deceleration of the engine, perhaps for take-off, go around or top of decent) might occur over a period of ten seconds. A cabin pressurisation drop by 10% in the event that the cabin blower is non-operative is likely to take longer than ten seconds. 10%. Thus the disclosure of the first aspect may allow for an increase in the surge margin of a gas turbine engine compressor without compromising cabin pressurisation. This may allow operation of at least one engine compressor at a higher working line than would otherwise be possible, higher stage loading by design and/or alternative engine compressor designs made possible by a reduced surge margin requirement inherent in the compressor design.

Altering the power extracted by the cabin blower compressor may be achieved by means of control mechanisms already provided for basic control of the cabin blower compressor (e.g. a variable transmission between the spool and cabin blower compressor, variable inlet guide vanes for the cabin blower compressor and/or one or more fluid supply shut-off valves).

In some embodiments the control system is arranged such that the alteration in the power extracted by the cabin blower compressor is only performed in the event that the secondary control parameter indicates a transient sufficient to threaten the stability of at least one compressor of the gas turbine engine. Specifically it may be that engine performance perturbations that do not threaten compressor stability are filtered out and ignored by the control system. Such engine perturbations may manifest as rapidly varying thrust demands that tend to oscillate over time.

In some embodiments the control system is arranged such that the duration and/or magnitude of the alteration in the power extracted by the cabin blower compressor is limited to prevent a change in cabin air pressure and/or volume beyond one or more predetermined thresholds. There could for instance be a maximum time threshold for the alteration corresponding to a cabin filling time constant that could for instance be set at the time required for a 10% or one third drop in cabin pressurisation given non-running of the cabin blower compressor.

In some embodiments the controller restores control in accordance with the one or more primary control parameters alone in response to at least one of i) completion of the transient; ii) an end to a threat to the stability of one or more compressors of the engine; iii) a change in cabin air pressure and/or volume beyond a respective predetermined threshold.

In some embodiments the control system comprises a surge margin controller arranged to receive the secondary control parameter at an input and in response to selectively output one or more surge margin compensation signals that alter the power extracted from the spool by the cabin blower compressor via the one or more control mechanisms. Whether or not a surge margin compensation signal is outputted and/or the extent of the alteration it demands may depend on calculations performed by the surge margin controller (e.g. whether the secondary control parameter indicates a transient of sufficient magnitude to threaten the stability of at least one compressor of the gas turbine engine).

In some embodiments the surge margin controller is a multi-variable controller. A multi-variable controller takes into account any coupling or interaction that exists between dynamics/parameters (e.g. cabin-blower compressor dynamics, cabin pressurisation, engine spool dynamics and engine compressor dynamics). Various multi-variable controller implementations are known in the art (e.g. linear quadratic guassian and H infinity) and so they are not discussed further here.

It might for instance receive parameters such as engine thrust demand, high pressure compressor pressure ratio, intermediate pressure compressor pressure ratio and turbine gas temperature and output a signal that controls engine fuel flow, a signal that controls intermediate compressor inlet guide vane angle, a signal that controls high pressure inlet guide vane angle and the surge margin compensation signal.

In some embodiments the control system further comprises a cabin blower controller which outputs a blower control signal or signals which control the power extracted from the spool by the cabin blower compressor in response to an input signal or signals it receives, the control being exerted via the one or more control mechanisms. The signal received may be a compound signal comprising a summation of the primary control parameter(s) and any surge margin compensation signal sent by the surge margin controller. Alternatively the cabin blower controller may receive both the primary control parameter(s) and any surge margin compensation signal before outputting a blower control signal or signals that account for both. A further alternative is that the signal or signals received constitute only the primary control parameter(s), with the blower control signal being in accordance with that/those parameters alone. In this case any surge margin compensation signal may be used to control the control mechanisms directly and/or to modify any blower control signal or signals between their output from the cabin blower controller and their use in control of the one or more control mechanisms. This latter system may be appropriate where the cabin blower controller dynamics are too slow in order to achieve the desired influence over spool dynamics (i.e. the cabin blower controller dynamics suit cabin dynamics rather than spool dynamics). In this case the cabin blower compressor may be considered to provide a nominal operating point that satisfies the requirements of the cabin, with this nominal point being adjusted to account for engine transients.

The surge margin controller and/or cabin blower controller may be a single controller such as a processor of the gas turbine engine (e.g. an engine electronic controller). Alternatively one or both of the surge margin and cabin blower controllers may be distinct from an engine electronic controller. The engine electronic controller may supply the secondary control parameter to the surge margin controller. The primary control parameter may be supplied by an aircraft processor.

In some embodiments the primary control parameter is a cabin flow demand at a set delivery pressure. In other exemplary embodiments the primary control parameter is the cabin pressure itself.

In some embodiments the secondary control parameter is the thrust demanded from the gas turbine engine. Alternatively the secondary control parameter could be $$\frac{P30}{P20}\sqrt{\frac{TGT}{T20}}, \text{ or } \frac{P50}{P20},$$

where P30 is the pressure at which the high pressure compressor delivers air (total), P20 is the engine intake pressure (total), TGT is the turbine gas temperature, T20 is the engine intake total air temperature and P50 is the low pressure turbine exit pressure (total).

In some embodiments the control system is arranged such that the alteration is variable in accordance with the rate of change in thrust demanded during the transient. By way of example the alteration may be proportional to the rate of change in thrust demanded.

In some embodiments the control system is arranged such that the alteration in the spool power extracted by the cabin blower compressor is a reduction.

In some embodiments the reduction is such that for at least some rates of change in thrust demanded during the transient the cabin blower compressor extracts substantially no power from the spool.

According to a second aspect there is provided a cabin blower system comprising a control system in accordance with the first aspect, a gas turbine engine spool, a cabin blower compressor powered by the spool and arranged in use to compress fluid used in a cabin of an aircraft and one or more control mechanisms via which the control system controls the power extracted by the cabin blower compressor from the spool.

In some embodiments the cabin blower system further comprises a blower supply passage connecting a blower fluid collection inlet and the cabin blower compressor for delivering fluid to the cabin blower compressor. The blower fluid collection inlet may for example comprise a scoop which, where the gas turbine engine is a turbofan, may be provided in the bypass duct downstream of the fan. More specifically the blower fluid collection inlet may be provided on an outer wall of the bypass duct.

In some embodiments the cabin blower system comprises a blower supply passage valve which is selectively actuatuable under the control of the control system to alter the impediment to fluid flow through the blower supply passage. The blower supply passage valve may be the or one of the control mechanisms. Thus the alteration in the power extracted by the cabin blower may be achieved at least in part by control system actuation of the blower supply passage valve. The actuation may be by hydraulic means e.g. fueldraulic means (but could also be mechanical, pneumatic, or electrical). By partially closing the blower supply passage the flow to the cabin blower compressor may be reduced. Where there is reduced flow there will be reduced power absorbed by the cabin blower compressor. Actuating the blower supply passage valve to reduce the impediment to fluid flow will have the opposite effect.

In some embodiments the cabin blower system further comprises a cabin supply passage connecting the cabin blower compressor and the cabin for delivery of compressed fluid to the cabin. The cabin supply passage may deliver fluid to an environmental control system for managed venting to the cabin.

In some embodiments the cabin blower system comprises a cabin supply passage valve system which is selectively actuatable under the control of the control system to oppositely alter the impediment to fluid flow through the cabin supply passage and through a fluid dump line. The cabin supply passage valve may be the or one of the control mechanisms. Thus the alteration in the power extracted by the cabin blower may be achieved at least in part by control system actuation of the cabin supply passage valve system. The fluid dump line may vent fluid in the cabin supply passage to a lower pressure region or to atmosphere (e.g. to a bypass duct of the gas turbine engine). Where increased fluid is vented through the dump line, the pressure ratio across the cabin blower compressor may be reduced, thereby reducing the power it absorbs from the spool. Where decreased fluid is vented through the dump line, the opposite is true. The actuation may be by hydraulic means e.g. fueldraulic means (but could also be mechanical, pneumatic, or electrical).

In some embodiments the cabin blower system comprises an array of variable inlet guide vanes provided in the blower supply passage adjacent the cabin blower compressor, the variable inlet guide vanes being actuatable under the control of the control system to alter the condition of fluid delivered to the cabin blower compressor. It may be for instance that actuation of the variable inlet guide vanes alters the direction and/or volume of fluid reaching the cabin blower compressor. The variable inlet guide vanes may be the or one of the control mechanisms. Thus an alteration in the power extracted by the cabin blower may be achieved at least in part by control system actuation of the variable inlet guide vanes. Specifically a change in the volume of fluid pumped and/or an alteration in the angle of the fluid incident on the cabin blower compressor may alter the work it performs and therefore the power it absorbs from the spool. The actuation may be by hydraulic means e.g. fueldraulic means (but could also be mechanical, pneumatic, or electrical).

In some embodiments the cabin blower system comprises a transmission provided within a mechanical drive path between the spool and the cabin blower compressor, the transmission being actuatable under the control of the control system to alter the gearing between the spool and cabin blower compressor and therefore to alter the rate of rotation of the cabin blower compressor for a given spool speed. The mechanical drive path may also include an accessory gearbox of the gas turbine engine between the spool and transmission. The transmission may be a continuously variable transmission and specifically may be a toroidal continuously variable transmission. The transmission may be the or one of the control mechanisms. Thus the alteration in the power extracted by the cabin blower may be achieved at least in part by control system actuation of the transmission. Specifically where the cabin blower compressor rotates slower or is stationary it will pump less (or no fluid) and so will absorb less power from the spool. Similarly where the cabin blower compressor rotates faster, the opposite is true. The actuation may be by hydraulic means e.g. fueldraulic means (but could also be mechanical, pneumatic, or electrical).

In some embodiments the toroidal continuously variable transmission comprises at least one traction drive through which in use drive is transmitted, the traction drive comprising first and second toroids, the first and second toroids each having one of a pair of opposed toroidal surfaces and there being a set of rotatable variators disposed between the opposed toriodal surfaces and where further the first and second toroids are separated and are drivingly engaged via a wheel of each variator, each wheel running in use on both of the opposed toroidal surfaces.

In some embodiments the transmission further comprises a bypass drive transmission parallel to the toroidal continuously variable transmission. The toroidal continuously variable transmission may be a relatively inefficient way of delivering all drive. Thus if a direct bypass drive transmission is also provided, the toroidal continuously variable transmission may be principally used to vary the output of the direct drive. In this way the transmission efficiency may be increased.

In some embodiments the transmission is arranged such that in use drive from the toroidal continuously variable transmission and the bypass drive transmission is combined and delivered to the cabin blower compressor. It may be for example that the drive is combined in a differential planetary gearbox.

Provision of at least one of the means (i.e. blower supply passage valve, cabin supply passage valve, variable inlet guide vanes and transmission) of varying the power extracted from the spool by the cabin blower compressor may be principally desirable in respect of cabin pressurisation functionality. Specifically it may not be desirable for the cabin air flow and pressure to be determined by the particular operating point of the gas turbine at any particular moment. Where at least one of the means of varying the power extracted is provided it may be used to control the speed of the cabin blower compressor and thereby the flow volume supplied to an environmental control system for cabin supply use. Thus regardless of engine operating point and ambient air pressure the cabin flow and pressure can be maintained within acceptable limits. The opportunity provided by the infrastructure described to also temporarily reduce the load on the spool during an engine transient may be considered an additional benefit.

In some embodiments the spool is a low pressure or intermediate pressure spool.

According to a third aspect there is provided a method of increasing the surge margin of a gas turbine engine compressor during an engine transient, the engine having a cabin blower compressor arranged in use to compress fluid used in a cabin of an aircraft, the rotation of the cabin blower compressor being powered by a spool of the engine and its power extraction from the spool being controlled in accordance with one or more primary control parameters and where the method comprises altering the spool power extracted by the cabin blower compressor by comparison with the power that would have been extracted in accordance with the primary control parameters alone, in response to at least some modifications in a secondary control parameter indicative of the commencement or occurrence of an engine transient.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

Embodiments will now be described by way of example only, with reference to the Figures, in which.

Figure 1:
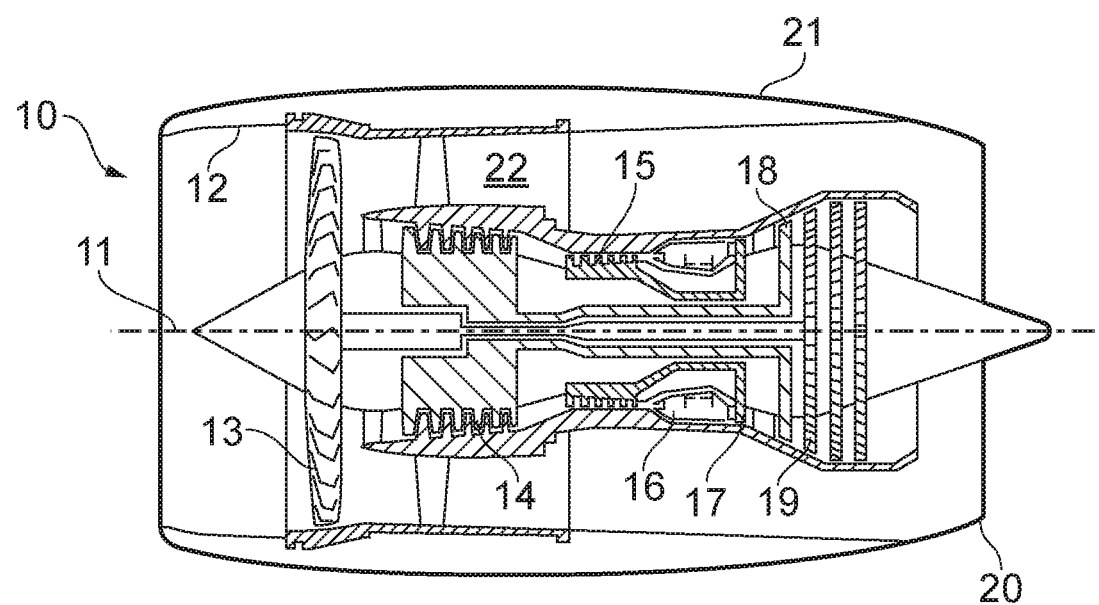
FIG. 1 is a sectional side view of a gas turbine engine.

With reference to FIG. 1, a gas turbine engine is generally indicated at 10, having a principal and rotational axis 11. The engine 10 comprises, in axial flow series, an air intake 12, a propulsive fan 13, an intermediate pressure compressor 14, a high-pressure compressor 15, combustion equipment 16, a high-pressure turbine 17, an intermediate pressure turbine 18, a low-pressure turbine 19 and an exhaust nozzle 20. A nacelle 21 generally surrounds the engine 10 and defines both the intake 12 and the exhaust nozzle 20.

The gas turbine engine 10 works in the conventional manner so that air entering the intake 12 is accelerated by the fan 13 to produce two air flows: a first air flow into the intermediate pressure compressor 14 and a second air flow which passes through a bypass duct 22 to provide propulsive thrust. The intermediate pressure compressor 14 compresses the air flow directed into it before delivering that air to the high pressure compressor 15 where further compression takes place.

The compressed air exhausted from the high-pressure compressor 15 is directed into the combustion equipment 16 where it is mixed with fuel and the mixture combusted. The resultant hot combustion products then expand through, and thereby drive the high, intermediate and low-pressure turbines 17, 18, 19 before being exhausted through the nozzle 20 to provide additional propulsive thrust. The high 17, intermediate 18 and low 19 pressure turbines drive respectively the high pressure compressor 15, intermediate pressure compressor 14 and fan 13, each by suitable interconnecting shaft.

Other gas turbine engines to which the present disclosure may be applied may have alternative configurations. By way of example such engines may have an alternative number of interconnecting shafts (e.g. two) and/or an alternative number of compressors and/or turbines. Further the engine may comprise a gearbox provided in the drive train from a turbine to a compressor and/or fan.

Figure 2:
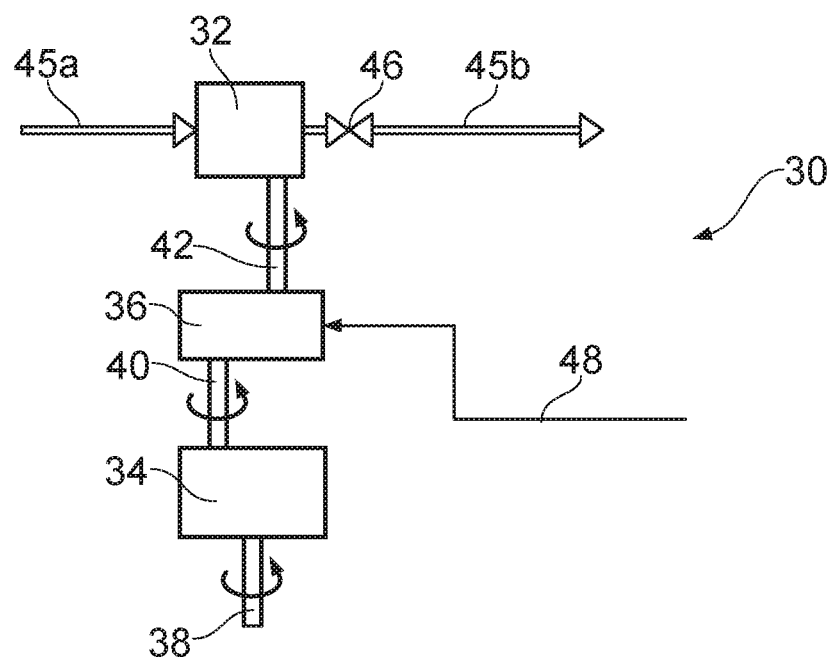
FIG. 2 is a schematic view of a cabin blower system in accordance with an embodiment of the invention.

Referring now to FIG. 2 a cabin blower system is generally provided at 30.

The cabin blower system 30 has a spool of a gas turbine engine (not shown) and a cabin blower compressor 32 connected in a driving relationship. In the drive path intermediate the spool and cabin blower compressor 32 are an accessory gearbox 34 of the gas turbine engine and a transmission 36. The spool of the gas turbine engine and the accessory gearbox 34 are drivingly coupled by an accessory gearbox shaft 38. The accessory gearbox 34 and transmission 36 are drivingly coupled by an intermediate shaft 40. The transmission 36 and cabin blower compressor 32 are drivingly coupled by a compressor shaft 42. As will be appreciated, in other embodiments variations to the arrangement above are possible. It may be for instance that the accessory gearbox 34 could be omitted from the drive path and the intermediate shaft 40 drivingly coupling the transmission 36 directly to the spool of the gas turbine engine.

The cabin blower compressor 32 is disposed in a duct system 44 comprising a blower supply passage 45a between a scoop (not shown) on an outer wall of a bypass duct (not shown) of the gas turbine engine and the cabin blower compressor 32 and a cabin supply passage 45b between the cabin blower compressor 32 and aircraft cabin air conditioning outlets (not shown). Within the cabin supply passage 45b is a starter air shut off valve 46. The shut-off valve 46 is arranged to be operable to alternatively allow one of two conditions. In a first condition the valve 46 permits the flow of air from the cabin blower compressor 32 towards the air conditioning outlets and seals communication between the duct system cabin supply passage 45b and a starter conduit (not shown). The starter conduit connects the cabin supply passage 45b at the location of the valve 46 and a port to atmosphere. In a second condition the valve 46 permits flow from the starter conduit towards the cabin blower compressor 32 and prevents flow towards the air conditioning outlets.

Between the cabin blower compressor 32 and the valve 46 is an array of variable exit guide vanes (not shown) disposed immediately adjacent the cabin blower compressor 32.

Within the blower supply passage 45a and immediately adjacent the cabin blower compressor 32 is an array of variable inlet guide vanes (not shown).

The system 30 has both a forward and a reverse configuration which in use allow the system 30 to perform as a cabin blower or as part of a starter system for the gas turbine engine respectively.

In the forward configuration the cabin blower compressor 32 is driven by the spool via the accessory gearbox shaft 38, the accessory gearbox 34, the intermediate shaft 40, the transmission 36 and the compressor shaft 42. The cabin blower compressor 32, driven by the spool, compresses air collected by the scoop and delivered to the cabin blower compressor 32 via the blower supply passage 45a. This compressed air is conditioned by the variable exit guide vanes, positioned accordingly, to convert radial velocity kinetic energy of the air into higher static pressure, allowing it to be turned with less loss. The variability of the exit guide vanes means that a wider range of air flow rates, velocities and pressures can be effectively conditioned. Thereafter the air is delivered by the cabin supply passage 45b for regulated use in the cabin of the aircraft via the air conditioning outlets. The starter air shut-off valve 46 is placed in its first condition so as to permit flow towards the air conditioning outlets and to prevent losses to atmosphere via the starter conduit. The rate at which the cabin blower compressor 32 is driven is controlled via the transmission 36, the gearing of which is controlled via a control signal 48 from a cabin blower controller 49.

In the reverse configuration the cabin blower compressor 32 acts as a turbine and drives the spool via the compressor shaft 42, transmission 36, intermediate shaft 40, accessory gearbox 34 and accessory gearbox shaft 38. The cabin blower compressor 32 is driven by gas (typically air) supplied from an external source via the starter conduit. With the valve 46 in its second condition gas supplied by the external source is supplied to the cabin blower compressor 32 in order to drive it, while losses to the air conditioning outlets are prevented. The variable exit guide vanes, positioned accordingly, are used to direct the gas delivered via the starter conduit so as to encourage efficient driving of the cabin blower compressor 32 in the opposite direction to its rotation when the system 30 is operating in the forward configuration. Furthermore the transmission 36 is adjusted so that despite the rotation of the cabin blower compressor 32 in the opposite direction to that when the system 30 is operated in the first configuration, the drive direction delivered to the shaft of the gas turbine engine is common to the direction of rotation of the same shaft when the system 30 is operated in the first configuration.

Figure 3:
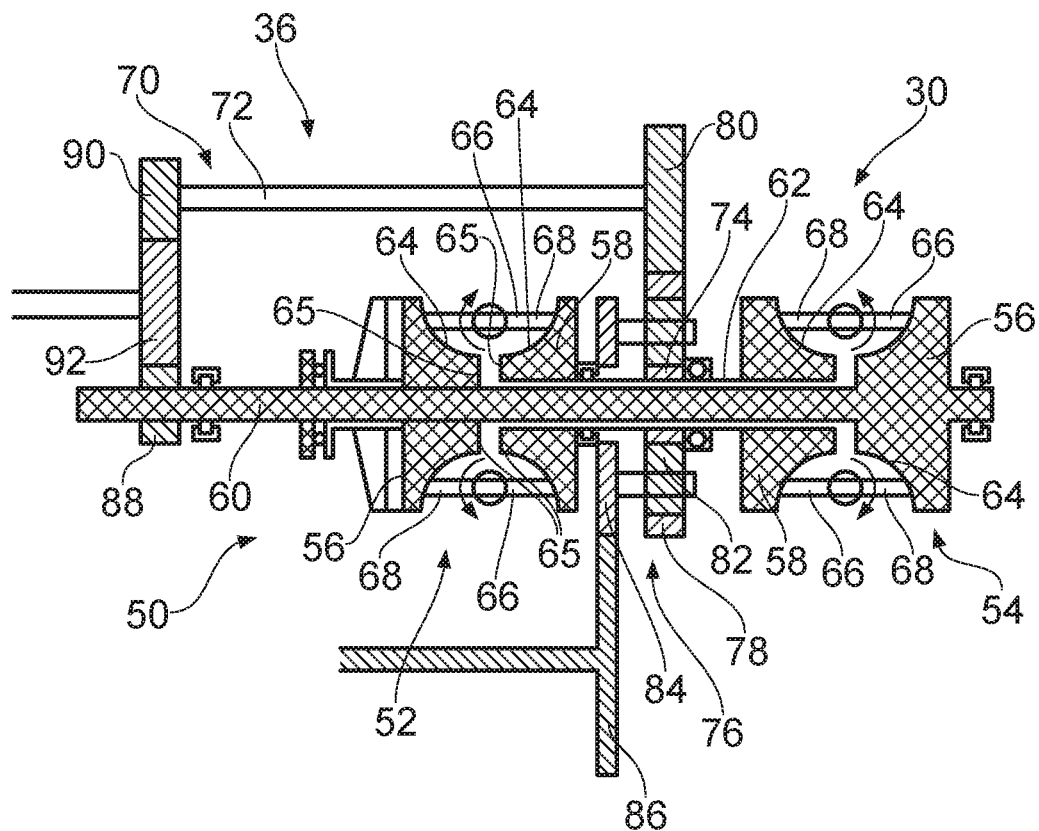
FIG. 3 is a cross-sectional view of a transmission in accordance with an embodiment of the invention shown in a forward configuration.
Figure 4:
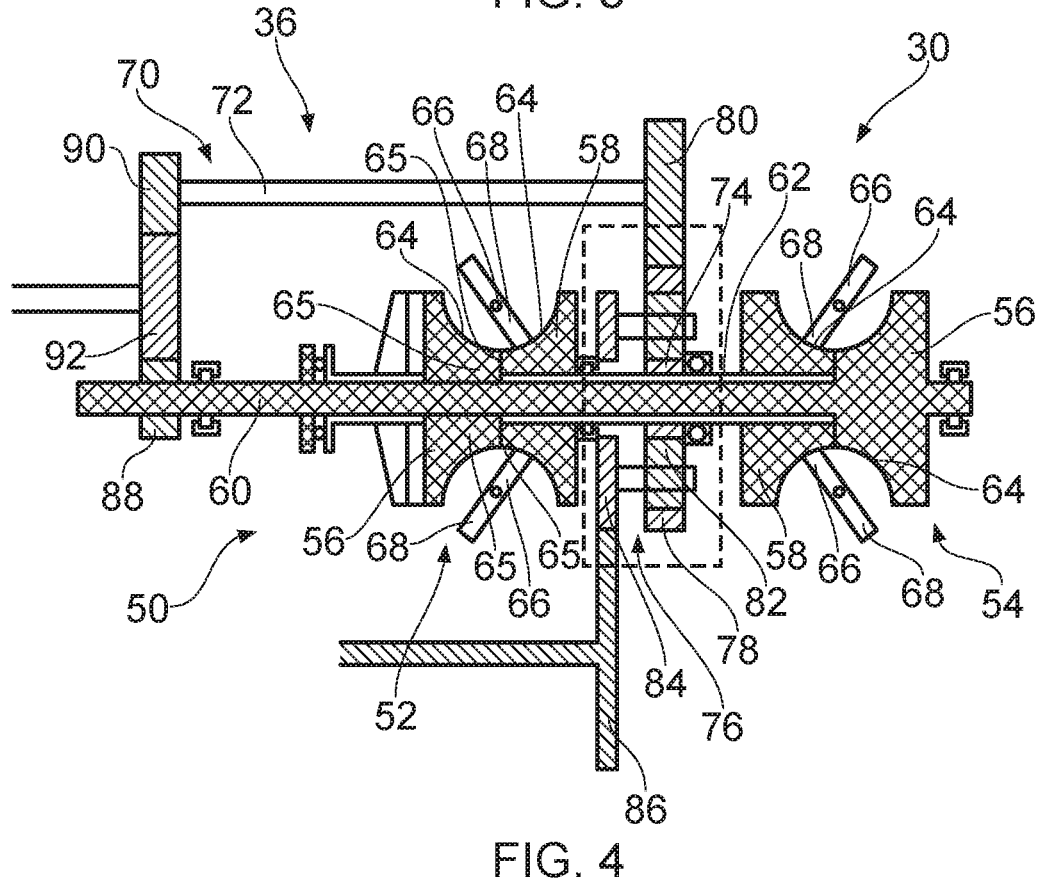
FIG. 4 is a cross-sectional view of the transmission of FIG. 3 shown in a reverse configuration.

Referring now to FIGS. 3 and 4 the transmission 36 and in particular it's first (FIG. 3) and second (FIG. 4) configurations are described in more detail.

The transmission 36 has a toroidal continuously variable transmission (CVT) generally provided at 50. The toroidal CVT 50 has first 52 and second 54 traction drives. Each traction drive 52, 54 has first 56 and second 58 toroids. The first toroid 56 of each traction drive 52, 54 is provided on and surrounds a first transmission shaft 60. The second toroid 58 of each traction drive 52, 54 is provided on and surrounds a second transmission shaft 62. The first 60 and second 62 transmission shafts are coaxial and the first transmission shaft 60 passes through the second transmission shaft 62. The first transmission shaft 60 is longer than the second transmission shaft 62 in order to accommodate the first toroids 56 provided thereon.

The first 56 and second 58 toroids of each traction drive 52, 54 define a pair of opposed toroidal surfaces 64 and a pair of opposed parallel engagement surfaces 65. Disposed between the opposed toroidal surfaces 64 of each traction drive 52, 54 are a set of rotatable variators 66 (two per traction drive 52, 54 shown). Each variator 66 has a wheel 68 capable of simultaneously engaging and running on the opposed toroidal surfaces 64 of the respective traction drive 52, 54. Each variator 66 is also rotatable about an axis so as to vary the diameter at which the wheel 68 engages each of the opposed toroidal surfaces 64, increasing the diameter for one and reducing it for the other of the opposed toroidal surfaces 64. Each variator 66 is also rotatable to a degree such that the wheel 68 no longer engages one of the opposed toroidal surfaces 64.

The transmission 36 also has a bypass drive transmission 70 having a bypass transmission shaft 72. The bypass transmission shaft is non-coaxial with the first 60 and second 62 transmission shafts and is radially displaced therefrom. The bypass transmission shaft 72 is however parallel to the first 60 and second 62 transmission shafts.

Provided on the second transmission shaft 62 is a first gear of the transmission 74. The first gear 74 is a sun gear of a differential planetary gearbox 76. A ring gear 78 of the gearbox 76 is engaged with a second gear of the transmission 80 provided on the bypass transmission shaft 72. Between and engaged with the sun gear (first gear 74) and ring gear 78 are a plurality of planet gears 82 supported by a planet carrier gear 84. The planet carrier gear 84 is engaged with a compressor gear 86 of the compressor shaft 42. Consequently the planet carrier gear 84 is engaged with the compressor 36. As will be appreciated, in alternative embodiments the first gear 74, second gear 80 and compressor gear 86 may be or may be engaged with alternative of the gears of the differential planetary gearbox 76 mentioned. Indeed each possible combination is considered in order that increased design freedom is available in terms of selecting fundamental gear ratios.

A third gear of the transmission 88 is provided on the first transmission shaft 60 and a fourth gear of the transmission 90 is provided on the bypass transmission shaft 72. The third gear 88 and fourth gear 90 both engage a common gear 92 provided on the intermediate shaft 40. Both the first transmission shaft 60 and bypass transmission shaft 72 are therefore engaged to the shaft of the gas turbine engine.

Referring specifically now to FIG. 3, the transmission 36 is shown in the forward configuration. In the forward configuration the first 56 and second 58 toroids of each traction drive 52, 54 are axially separated and the wheels 68 of each variator 66 engage both respective opposed toroidal surfaces 64. Consequently the opposed parallel engagement surfaces 65 are axially separated and therefore non-engaged. Power is delivered to the transmission 36 from the shaft of the gas turbine engine via the intermediate shaft 40 and common gear 92. This drives both the first transmission shaft 60 and bypass transmission shaft 72. The first transmission shaft 60 drives the second transmission shaft 62 via the first 56 and second 58 toroids and the variator wheels 68. The bypass transmission shaft 72 and second transmission shaft 62 provide input drive to the gearbox 76 in opposite directions. Output from the gearbox 76 is via its planet carrier gear 84, via which drive is delivered to the cabin blower compressor 32.

As will be appreciated the rate at which the planet carrier gear 84 spins and therefore the rate at which the compressor 32 is turned will depend on the relative input rates to the gearbox 76 from the bypass transmission shaft 72 and the second transmission shaft 62. These relative rotation rates will determine the combined drive rate outputted via the planet gears 82. Thus because the input from the second transmission 62 is variable in accordance with the rotational position of the variators 66, the rate at which the cabin blower compressor 32 is spun is selectively variable. Control over the rotational position of the variators 66 is in accordance with signals 48 from the controller (not shown). Specifically the signals will determine the position to which the variators 66 are rotated and therefore the diameter of the respective opposed toroidal surfaces 64 at which the wheels 68 engage. The rotation therefore allows adjustment to be made to the gearing between the toroids 56, 58. The signals sent by the cabin blower controller 49 are in dependence upon cabin air conditioning and pressurisation requirements. Because the toroidal CVT 50 is effectively used to modify the drive provided by the bypass drive transmission 70, power transmission may be more efficient than if power was transmitted exclusively via the toroidal CVT 50.

Referring specifically now to FIG. 4, the transmission 36 is shown in the reverse configuration. In the reverse configuration the first 56 and second 58 toroids of each traction drive 52, 54 are in direct engagement via their opposed parallel engagement surfaces 65. As will be appreciated the first 56 and second 58 toroids of each traction drive 52, 54 have been forced together by comparison with their position in the first configuration (FIG. 3). In order to achieve this the variators 66 are rotated so as their wheels 68 no longer engage the first toroid 56 in each traction drive 52, 54 and so as the rotation is sufficient such that the variators 66 would no longer impede the closing of the axial gap between the toroids 56, 58. Thereafter the toroids 56, 58 of each variator 66 are moved together and forced into a resilient engagement at their opposed parallel engagement surfaces 65 by an end load delivery system 94 comprising a hydraulically actuated piston. Power is delivered to the transmission 36 from the cabin blower compressor 32 driven by an external source of gas and acting as a turbine. Power from the cabin blower compressor 32 is delivered via the compressor shaft 42 and compressor gear 86 to the planet carrier gear 84 and into the gearbox 76. The gearbox 76 drives the second transmission shaft 62 and bypass transmission shaft 72. The second transmission shaft 62 drives the first transmission shaft 60 via the rotationally locked toroids 56, 58 of each traction drive 52, 54. The first transmission shaft 60 and bypass transmission shaft 72 drive the gear of the gas turbine engine via the common gear 92 and intermediate shaft 40. In this way the spool of the gas turbine engine can be turned and air delivered to combustors before fuel is delivered and ignited.

As will be appreciated, after engine start, the system 30 can be returned to the forward configuration for delivering pressurised cabin air by driving the toroids 56, 58 apart using the end load delivery system 94. Thereafter the variators 66 are rotated so as the wheels 68 are orientated for engagement with both opposed toroidal surfaces 64 before the end load delivery system 94 drives the toroids 56, 58 towards each other until the wheels 68 engage both toroids. As will be appreciated, further temporary separation of the toroids 56, 58 by the end load delivery system 94 may be desirable and/or necessary before the variators 66 are re-oriented so as to be primed for engagement of the engagement surfaces 65 and operation of the system 30 in the reverse configuration.

Figure 5:
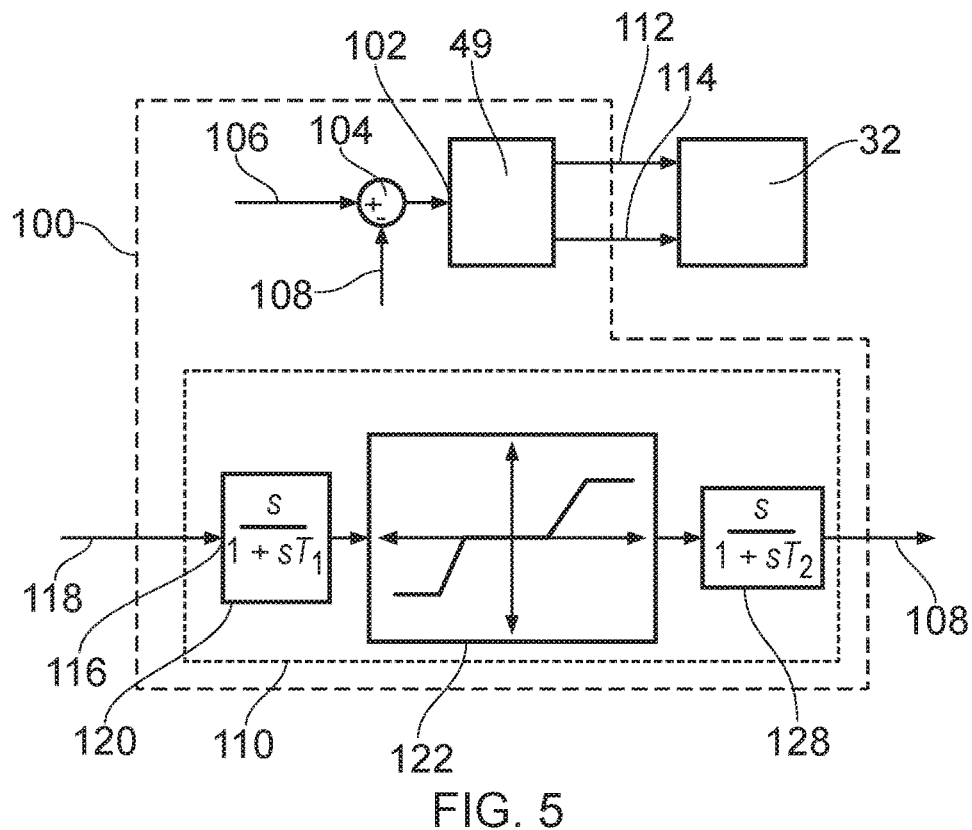
FIG. 5 is schematic view of a control system in accordance with an embodiment of the invention.

Referring now to FIG. 5 a control system for the cabin blower system 30 is generally shown at 100. The control system 100 includes the cabin blower controller 49 which has a processor (not shown). The cabin blower controller 49 also has a blower controller input 102 for receiving input signals from a summer 104. The summer 104 receives in real time and sums a primary control parameter (in this case a cabin flow demand signal 106 sent from an aircraft processor) and any surge margin compensation signal 108 sent from a surge margin controller 110. The resultant output from the summer 104 is a compound signal sent to the blower controller input 102. The processor of the cabin blower controller 49 determines whether adjustment of the cabin blower compressor 32 rotation rate is required in view of the compound signal received at that time. Where an adjustment is required the processor alters operation of the transmission 36 and/or the variable inlet guide vanes using one or more signals sent respectively via a transmission adjustment channel 112 and a variable inlet guide vane adjustment channel 114. The transmission 36 and variable inlet guide vanes are control mechanisms that allow adjustment of the rate of rotation of the cabin blower compressor 32.

The surge margin controller 110 has a surge margin controller input 116 which receives a secondary control parameter (in this case the thrust demanded 118) in real time from an engine electronic controller of the gas turbine engine. In this case the thrust demand 118 is a desired turbofan pressure ratio over a desired fan speed, but in other cases it may be some other signal or parameter indicating an impending or detected transient or threat to compressor stability. The surge margin controller 110 also has a processor (not shown) which calculates a rate at which the thrust demanded is changing and applies a low pass filter (together comprising a transfer function step 120). The low pass filter filters out instances of high rate of change in thrust demand. Such high rate of change thrust demands may arise from perturbations in engine electronic control input parameters. The transfer function 120 may therefore tend to remove these, leaving only rates of change in thrust demand indicative of genuine engine transients. The low pass filter may be expressed as $$\frac{1}{1+sT_1}$$

and the transfer function that produces the filtered derivative as $$\frac{s}{1+sT_1},$$

where s is the derivative of the thrust demand 118 with respect to time and $T_1$ is a time constant which determines the cut-off of the low pass filter. $T_1$ is set at a level which filters out perturbations due to which it is determined that there should be no surge margin compensation signal.

The controller 110 applies a surge margin compensation schedule 122 which determines the magnitude of an input to a washout filter 124 in accordance with the output from the transfer function 120. Where the output from the transfer function 120 is sufficiently low to indicate that the transient doesn't threaten the stability of at least one compressor of the gas turbine engine, the schedule 122 dictates that there is no surge margin compensation. As the magnitudes increase above this however, the schedule 122 dictates that increasing degrees of surge margin compensation are applied up to a maximum degree of compensation (beyond which the stability of the cabin blower compressor 32 might be compromised) for magnitudes above a particular value.

Finally the processor of the surge margin controller 110 applies a washout filter 124 (high pass filter) to the output from the schedule which serves to ensure that any surge margin compensation is not employed beyond a point where cabin pressurisation would be unduly compromised. The washout filter 124 may be $$\frac{s}{1+sT_2}$$

where $T_2$ is a time constant which determines the cut-off of the washout filter. $T_2$ is set at a level which ensures that adjustment of the cabin blower compressor 32 is tailed off before cabin air quality passes a predetermined threshold. In dependence on the output from the washout filter 124, the processor generates a surge margin compensation signal 108 and transmits it to the summer 104.

In use the engine electronic controller of the gas turbine engine regularly makes small and rapid adjustments to the thrust demanded in response to variations in its input parameters. These variations in thrust demand are received by the surge margin controller 110 but do not result in the generation of a surge margin compensation signal 108 because they are filtered out by the transfer function 120. Where however a transient is gradual enough to pass beyond the transfer function 120, the schedule 122 is applied to determine whether and the degree of any surge margin compensation given the pace of the transient and consequent threat to one or more compressors of the engine. Where a surge margin compensation is required the processor generates and sends a surge margin compensation signal 108. The surge margin compensation signal 108 is received by the summer 104 and combined with the cabin flow demand signal 106 sent from the aircraft processor. The summer 104 sends the compound signal to the blower controller input 102 of the cabin blower controller 49. The processor of the cabin blower controller 49 then adjusts the transmission 50 and/or variable inlet guide vanes via the transmission adjustment channel 112 and variable inlet guide vane adjustment channel 114 to control the power extracted from the spool by the cabin blower compressor 32. The adjustment(s) reduce the spool power extracted by the cabin blower compressor 32 by comparison with the power that would have been extracted in accordance with the cabin flow demand signal 106 alone, in response to modifications in the thrust demanded.

Figure 6:
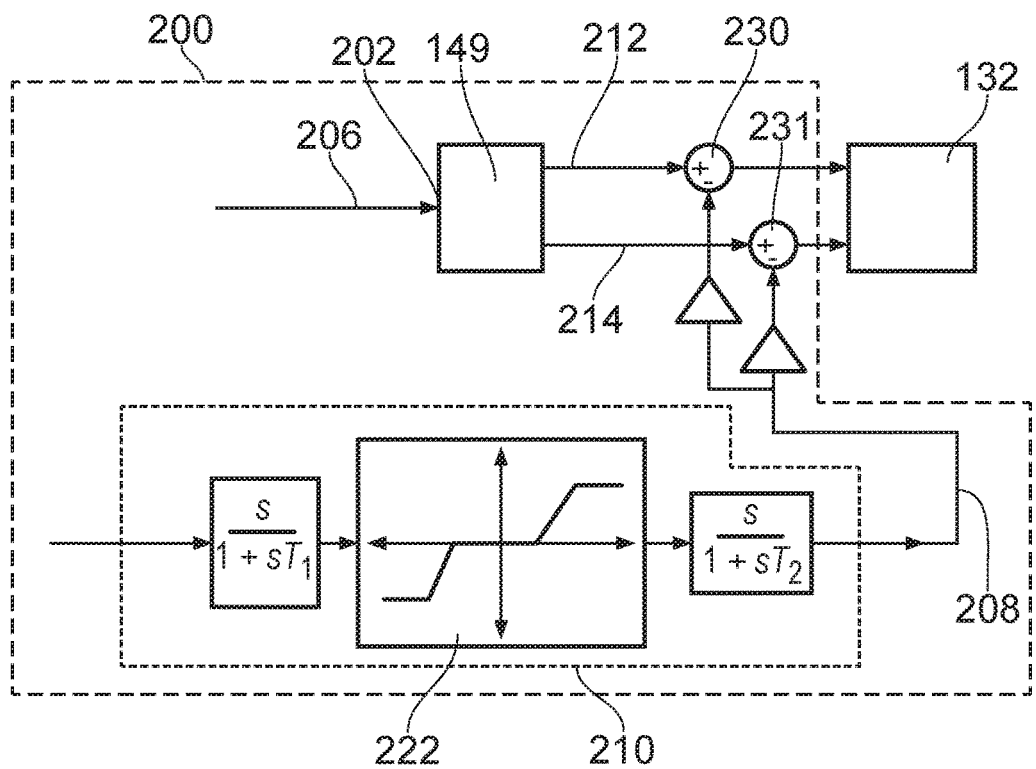
FIG. 6 is schematic view of a control system in accordance with an embodiment of the invention.

FIG. 6 shows a control system 200 similar to the control system 100 of FIG. 5, with the exception that the surge margin compensation signal is applied directly at the transmission adjustment channel and variable inlet guide vane adjustment channel rather than being summed with the cabin flow demand signal.

FIG. 6 shows a cabin blower compressor 132 and a cabin blower controller 149. The cabin blower controller 149 has a blower controller input 202 for receiving real time primary control parameter values (in this case cabin flow demand signals 206 sent from an aircraft processor). There is also a surge margin compensation signal 208 sent from a surge margin controller 210 and transmission adjustment 212 and variable inlet guide vane adjustment 214 channels via which a processor of the cabin blower controller 149 alters operation of the transmission 36 and/or the variable inlet guide vanes based on the cabin flow demand signals 206. The transmission 36 and variable inlet guide vanes are control mechanisms that allow adjustment of the rate of rotation of the cabin blower compressor 132.

The surge margin controller 210 is similar to the surge margin controller 110 of the FIG. 5 embodiment, but its surge margin compensation schedule 222 demands a surge margin compensation signal 208 that when used to adjust both the transmission 36 and variable inlet guide vanes, will give the desired alteration in cabin blower compressor 132 power extraction.

The surge margin compensation signal 208 is used to alter signals sent by the cabin blower controller 149 which would otherwise adjust the transmission 36 and variable inlet guide vanes to alter the power extracted by the cabin blower compressor 132 based purely on the cabin flow demand signals 206. The alteration is made via a transmission signal summer 230 and a variable inlet guide vane signal summer 231. The transmission signal summer 230 sums the surge margin compensation signal 208 and the signal sent from the processor of the cabin blower controller 149 on the transmission adjustment line 212 and sends a compound signal that accordingly adjusts the transmission 36. The variable inlet guide vane signal summer 231 sums the surge margin compensation signal 208 and the signal sent from the processor of the cabin blower controller 149 on the variable inlet guide vane adjustment line 214 and sends a compound signal that accordingly adjusts the variable inlet guide vanes.

Figure 7:
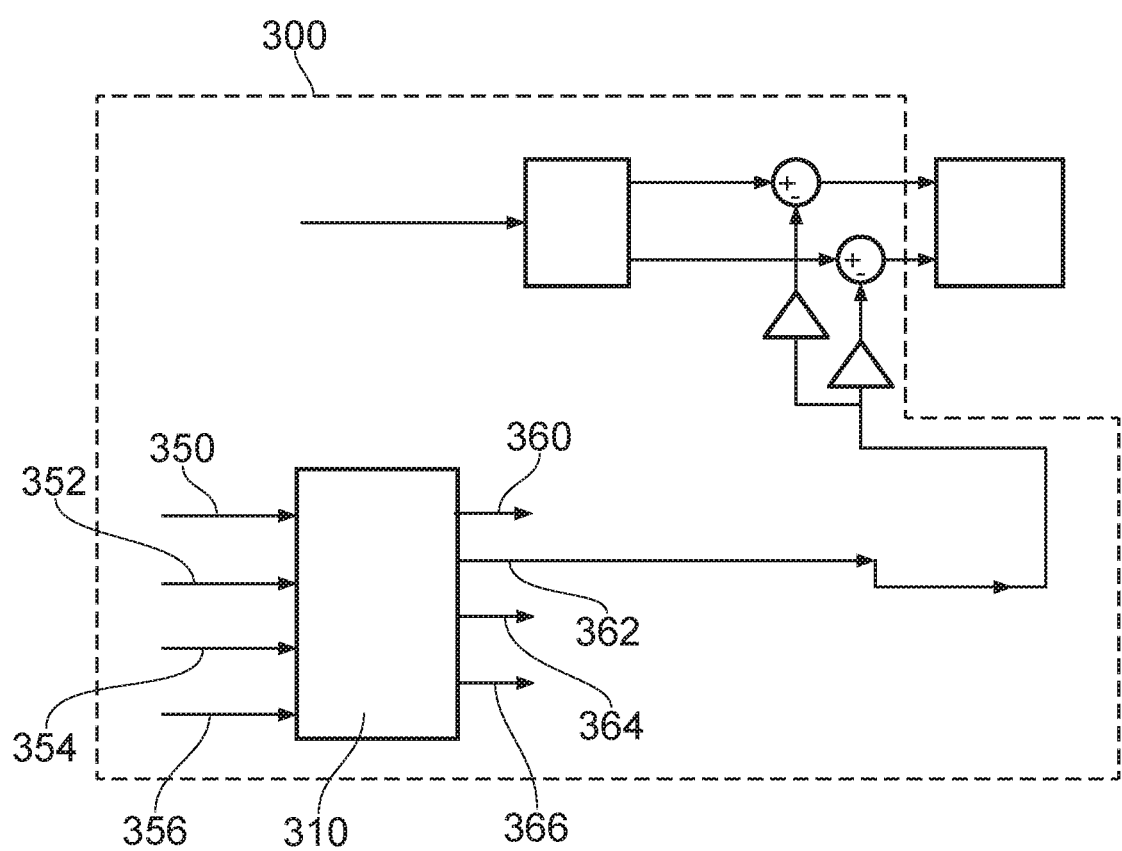
FIG. 7 is schematic view of a control system in accordance with an embodiment of the invention.

FIG. 7 shows a control system 300 similar to the control system 200 of FIG. 6, with the exception that the surge margin controller 210 is replaced with a multi-variable controller 310. The multi-variable controller 310 has several inputs: a thrust demand input 350, a high pressure compressor pressure ratio input 352, an intermediate pressure compressor pressure ration input 354 and a turbine gas temperature input 356. Each input 350, 352, 354, 356 receives demands or sensor data (as appropriate) concerning the relevant parameter in the form of signals. The multi-variable controller 310 also has several outputs: a fuel flow output 360, a surge margin compensation output 362, an intermediate pressure compressor variable inlet guide vane angle output 364 and a high pressure compressor variable inlet guide vane angle output 366. Each output 360, 362, 364, 366 sends a signal used to set the relevant parameter. A processor (not shown) of the multi-variable controller 310 determines the signals that are sent via the outputs 360, 362, 364, 366 in accordance with algorithms and/or schedules that account for the input signals in determining the output signals.

It will be understood that the invention is not limited to the embodiments above-described and various modifications and improvements can be made without departing from the concepts described herein. By way of example the embodiments described above are indicated to selectively decrease the load on the spool exerted by the cabin blower compressor, but it may also or alternatively be that in these or other embodiments the load is selectively increased in a similar manner. At particular engine operating points such an increase may improve compressor stability or otherwise favourably adjust the operation of the engine. Further in the embodiments described above the transmission and variable inlet guide vanes are used as control mechanism s to adjust the power extracted by the cabin blower compressor, but alternative or additional control mechanisms may be used (e.g. a blower supply passage valve and/or a cabin supply passage valve). Except where mutually exclusive, any of the features may be employed separately or in combination with any other features and the disclosure extends to and includes all combinations and sub-combinations of one or more features described herein.

The invention claimed is:

1. A cabin blower control system arranged for use in controlling a cabin blower system, the cabin blower control system comprising:
   a gas turbine engine spool of a gas turbine engine;
   a cabin blower compressor powered by the gas turbine engine spool by extracting power from the gas turbine engine spool, and the cabin blower compressor is configured, in use, to compress a fluid used in a cabin of an aircraft; and
   at least one controller configured to:
   control the power extracted from the gas turbine engine spool by the cabin blower compressor in accordance with at least one primary control parameter based on an operating condition of the cabin blower compressor; and
   reduce the power extracted by the cabin blower compressor in accordance with a secondary control parameter indicative of a commencement or occurrence of an engine transient operating condition of the gas turbine engine causing a compressor working line to reach or exceed a surge margin of the gas turbine engine, the power extracted from the gas turbine engine spool in accordance with the secondary control parameter being lower than the power extracted from the gas turbine engine spool in accordance with the at least one primary control parameter.

2. The cabin blower control system according to claim 1, wherein the at least one controller is configured to reduce the power extracted by the cabin blower compressor only when the secondary control parameter indicates the engine transient operating condition is sufficient to threaten a stability of at least one compressor of the gas turbine engine.

3. The cabin blower control system according to claim 1, wherein a duration or a magnitude of reducing the power extracted by the cabin blower compressor is limited to prevent a change in cabin air pressure or volume beyond one or more predetermined thresholds.

4. The cabin blower control system according to claim 1, wherein the at least one controller is configured to restore control in accordance with the at least one primary control parameter alone in response to at least one of i) completion of the engine transient operating condition, ii) an end to a threat to a stability of one or more additional compressors of the gas turbine engine, and iii) a change in cabin air pressure or volume beyond a respective predetermined threshold.

5. The cabin blower control system according claim 1, wherein the at least one controller includes a surge margin controller arranged to receive the secondary control parameter at an input and in response to selectively output one or more surge margin compensation signals that alter the power extracted from the turbine engine spool by the cabin blower compressor via one or more control mechanisms.

6. The cabin blower control system according to claim 1, wherein the at least one controller includes a cabin blower controller configured to output a blower control signal or signals that controls the power extracted from the turbine engine spool by the cabin blower compressor in response to an input signal or signals received by the cabin blower controller, the blower control signal or signals being based on one or more control mechanisms.

7. The cabin blower control system according to claim 1, wherein the at least one primary control parameter is a cabin flow demand at a set delivery pressure.

8. The cabin blower control system according to claim 1, wherein the secondary control parameter is a thrust demanded from the gas turbine engine.

9. The cabin blower control system according to claim 1, wherein reducing the power extracted from the gas turbine engine spool is variable in accordance with a rate of change in thrust demanded during the engine transient operating condition.

10. The cabin blower control system according to claim 1, wherein the at least one controller is configured to reduce the power extracted by the cabin blower compressor to extracting no power from the gas turbine engine spool for a plurality of rates of change in thrust demanded during the engine transient operating condition.

11. The cabin blower control system according to claim 1, further comprising a blower supply passage connecting a blower fluid collection inlet and the cabin blower compressor for delivering the fluid to the cabin blower compressor, and an array of variable inlet guide vanes provided in the blower supply passage adjacent the cabin blower compressor, the array of variable inlet guide vanes being actuatable under control of the control cabin blower system to alter a condition of the fluid delivered to the cabin blower compressor.

12. The cabin blower control system according to claim 1, further comprising a transmission provided within a mechanical drive path between the gas turbine engine spool and the cabin blower compressor, the transmission being actuatable under control of the cabin blower control system to alter a gearing between the gas turbine engine spool and the cabin blower compressor, the transmission is configured to change a rate of rotation of the cabin blower compressor for a given gas turbine engine spool speed.

13. A method of increasing a surge margin of a gas turbine engine during an engine transient operating condition, the gas turbine engine having a cabin blower compressor powered by a spool by extracting power from the spool, and the cabin blower compressor is configured, in use, to compress fluid used in a cabin of an aircraft, the power extracted from the spool being controlled in accordance with at least one primary control parameter based on an operating condition of the cabin blower compressor, the method comprising:
reducing the power extracted by the cabin blower compressor in accordance with a secondary control parameter indicative of a commencement or occurrence of an engine transient operating condition of the gas turbine engine causing a compressor working line to reach or exceed a surge margin of the gas turbine engine, the power extracted from the spool in accordance with the secondary control parameter being lower than the power extracted from the spool in accordance with the at least one primary control parameter.

* * * * *